(12) United States Patent
McKenney

(10) Patent No.: US 11,055,271 B2
(45) Date of Patent: Jul. 6, 2021

(54) FUNNEL LOCKING FOR SLEEPABLE READ-COPY UPDATE

(71) Applicant: International Business Machines Corporation, Armonk, NY (US)

(72) Inventor: Paul E. McKenney, Beaverton, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 200 days.

(21) Appl. No.: 15/811,090

(22) Filed: Nov. 13, 2017

(65) Prior Publication Data

US 2019/0147077 A1 May 16, 2019

(51) Int. Cl.
*G06F 16/23* (2019.01)
(52) U.S. Cl.
CPC ...... *G06F 16/2315* (2019.01); *G06F 16/2365* (2019.01); *G06F 16/2379* (2019.01)
(58) Field of Classification Search
CPC ............. G06F 16/2315; G06F 16/2379; G06F 16/2365
USPC ........................................................ 707/615
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 4/1997 | Slingwine et al. | |
| 5,727,209 A | 3/1998 | Slingwine et al. | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,191,272 B2 | 3/2007 | McKenney | |

(Continued)

OTHER PUBLICATIONS

"Paul McKenney, Hierarchical RCU, 2008, Lwn.net/Articles/305782" (Year: 2008).*

(Continued)

*Primary Examiner* — Tony Mahmoudi
*Assistant Examiner* — Michael Le
(74) *Attorney, Agent, or Firm* — Noah Sharkan, Esq.; Kevin P. Radigan, Esq.; Heslin Rothenberg Farley & Mesiti P.C.

(57) ABSTRACT

A funnel locking technique improves scalability of callback handling while mediating grace-period-start requests in a sleepable read-copy update (SRCU) environment. Per-CPU data structures maintain lists of SRCU callbacks. A management data structure maintains a current-grace-period record tracking a current SRCU grace period and a future-grace-period record tracking a future SRCU grace period needed by the callbacks. A combining tree mediates grace-period-start requests concurrently vying for an opportunity to update the future-grace-period record. The grace-period-start requests are issued on behalf of the callbacks to a combining tree leaf level and propagate toward a combining tree root node. The future-grace-period record is updated in response to grace-period-start requests reaching the root node. The current-grace-period record is updated to start a new SRCU grace period in response to grace-period-start requests reaching the root node if the future SRCU grace period has not completed and there is no SRCU grace period in progress.

18 Claims, 8 Drawing Sheets

(56) References Cited

U.S. PATENT DOCUMENTS

| | | | |
|---|---|---|---|
| 7,287,135 B2 | 10/2007 | McKenney et al. | |
| 7,353,346 B2 | 4/2008 | McKenney et al. | |
| 7,349,879 B2 | 6/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |
| 7,472,228 B2 | 12/2008 | McKenney et al. | |
| 7,653,791 B2 | 1/2010 | McKenney | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,818,306 B2 | 10/2010 | McKenney et al. | |
| 7,904,436 B2 | 3/2011 | McKenney | |
| 7,953,708 B2 | 5/2011 | McKenney et al. | |
| 7,953,778 B2 | 5/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,407,503 B2 | 3/2013 | McKenney | |
| 8,495,641 B2 | 7/2013 | McKenney | |
| 8,615,771 B2 | 12/2013 | McKenney | |
| 8,706,706 B2 | 4/2014 | McKenney | |
| 8,874,535 B2 | 10/2014 | McKenney | |
| 8,924,655 B2 | 12/2014 | McKenney | |
| 8,938,631 B2 | 1/2015 | McKenney | |
| 8,972,801 B2 | 3/2015 | McKenney | |
| 9,003,420 B2 | 4/2015 | McKenney | |
| 9,189,413 B2 | 11/2015 | McKenney | |
| 9,250,978 B2 | 2/2016 | McKenney | |
| 9,256,476 B2 | 2/2016 | McKenney | |
| 9,348,765 B2 | 5/2016 | McKenney | |
| 9,396,226 B2 | 6/2016 | McKenney | |
| 9,389,925 B2 | 7/2016 | McKenney | |
| 9,519,307 B2 | 12/2016 | McKenney | |
| 9,552,236 B2 | 1/2017 | McKenney | |
| 9,720,836 B2 | 8/2017 | McKenney | |
| 9,886,329 B2 | 2/2018 | McKenney | |
| 9,965,432 B2 | 5/2018 | McKenney | |
| 2006/0100996 A1* | 5/2006 | McKenney | G06F 16/2379 |
| 2008/0082532 A1 | 4/2008 | McKenney | |
| 2010/0023946 A1* | 1/2010 | McKenney | G06F 9/526 718/102 |
| 2011/0137962 A1* | 6/2011 | McKenney | G06F 16/2365 707/818 |
| 2013/0061071 A1 | 3/2013 | McKenney | |
| 2013/0311995 A1 | 11/2013 | McKenney | |
| 2014/0089939 A1 | 3/2014 | McKenney | |
| 2014/0223199 A1 | 8/2014 | McKenney | |
| 2015/0153817 A1* | 6/2015 | McKenney | G06F 9/5094 713/323 |
| 2016/0378573 A1* | 12/2016 | McKenney | G06F 9/526 710/200 |
| 2017/0097916 A1 | 4/2017 | McKenney | |
| 2018/0046468 A1 | 2/2018 | McKenney | |
| 2018/0060086 A1 | 3/2018 | McKenney | |
| 2018/0095666 A1 | 4/2018 | McKenney | |
| 2018/0165125 A1 | 6/2018 | McKenney | |
| 2018/0267840 A1 | 9/2018 | McKenney | |
| 2020/0104176 A1 | 4/2020 | McKenney | |

OTHER PUBLICATIONS

"Paul McKenney, Sleepable RCU, 2006, Lwn.net/Articles/202847" (Year: 2006).*

Sheth et al., "Read-Copy Update in a Garbage Collected Environment", Mar. 1, 2017, 15 pages (Year: 2017).*

P. McKenney et al., "Read-Copy Update: Using Execution History to Solve Concurrency Problems," PDCS, Oct. 1998, 11 pages.

P. McKenney et al., "Read-Copy Update," 2001 Ottawa Linux symposium, 2001-07, 22 pages.

H. Lindar et al., "Scalability of the Directory Entry Cache," 2002 Ottawa Linux Symposium, Jun. 26, 2002, pp. 289-300.

P. McKenney et al.,"Read-Copy Update," 2002 Ottawa Linux Symposium, Jul. 8, 2002, 32 pages.

A. Arcangeli et al., "Using Read-Copy-Update Techniques for System V IPC in the Linux 2.5 Kernel," 2003 Freenix, Jun. 14, 2003, 13 pages.

P. McKenney et al., "Using RCU in the Linux 2.5 Kernel," Linux Journal, Oct. 1, 2003, 11 pages.

P. McKenney et al., "Scaling dcache with RCU," Linux Journal, Jan. 1, 2004, 12 pages.

P. McKenney, "RCU vs. Locking Performance on Different CPUs," 2004 Linux.conf.au, 2004, 18 pages.

P. Zijlstra, "[PATCH] slab: document SLAB_DESTROY_BY_RCU", LKML.org, Nov. 13, 2008, 1 page.

D. Sarma et al., "Making RCU Safe for Deep Sub-Millisecond Response Realtime Applications," 2004 USENIX (UseLinux track) Jun. 2004, 9 pages.

P. McKenney et al., "Extending RCU for Realtime and Embedded Workloads," 2006 Ottawa Linux Symposium, Aug. 11, 2006, 15 pages.

P. McKenney, "Sleepable RCU", LWN.net, Oct. 9, 2006, 10 pages.

T. Gleixner, High Resolution Timers / Dynamic Tics—V2, LWN. net, Oct. 31, 2006, 5 pages.

P. McKenney, "RCU and Unloadable Modules", LWN.net, Jan. 14, 2007, 4 pages.

P. McKenney, "Using Promela and Spin to verify parallel algorithms", LWN.net, Aug. 1, 2007, 11 pages.

P. McKenney, "The design of preemptible read-copy-update," LWN. net, Oct. 8, 2007, 27 pages.

T. Hart et al., "Performance of memory reclamation for lockless synchronization", Journal of Parallel and Distributed Computing, Dec. 2007, pp. 1270-1285.

P. McKenney, "What is RCU, Fundamentally", LWN.net, Dec. 17, 2007, 15 pages.

P. McKenney, What is RCU? Part 2: Usage, LWN.net,Dec. 24, 2007, 15 pages.

P. McKenney, RCU part 3: the RCU API, LWN.net, Jan. 7, 2008, 7 pages.

P. McKenney, "Integrating and Validating dynticks and Preemptible RCU," LWN.net, Apr. 22, 2008, 19 pages.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Hierarchical RCU," LWN.net, Nov. 4, 2008, 19 pages.

P. McKenney, "Using a Malicious User-Level RCU to Torture RCU-Based Algorithms", linux.conf.au, Jan. 2009, 51 pages.

M. Desnoyers, "Low-Impact Operating System Tracing", University of Montreal, PhD Thesis, Dec. 2009, 233 pages.

P. McKenney, "RCU: The Bloatwatch Edition", LWN.net, Mar. 17, 2009, 9 pages.

P. McKenney, "Expedited "big hammer" RCU grace periods", LKML.org, Jun. 25, 2009, 2 pages.

P. McKenney, "RCU cleanups and simplified preemptable RCU", LKML.org, Jul. 23, 2009, 1 page.

P. McKenney, "Deterministic Synchronization in Multicore Systems: the Role of RCU", Aug. 18, 2009, pp. 1-9.

P. McKenney, "Simplicity Through Optimization", linux.conf.au, Jan. 2010, 109 pages.

P. McKenney, "The RCU API, 2010 Edition", LWN.net, Dec. 8, 2010, 11 pages.

J. Triplett et al., "Resizable, Scalable, Concurrent Hash Tables via Relativistic Programming", ACM-SIGOPS Operating System Review vol. 44, Issue 3, Jul. 2010, 14 pages.

(56) References Cited

OTHER PUBLICATIONS

M. Desnoyers et al., "User-Level Implementations of Read-Copy Update", IEEE Transactions on Parallel and Distributed Systems, vol. x, No. y, Jul. 2009, pp. 1-14.

P. McKenney, "Making RCU Safe for Battery-Powered Devices", Embedded Linux Conference, Feb. 15, 2012, pp. 1-66.

P. McKenney, "Real-Time Response on Multicore Systems: It Is Bigger Than You Think", OSPERT '12 Workshop, Jul. 10, 2012, pp. 1-34.

P. McKenney, "Getting RCU Further Out of the Way", 2012 Linux Plumbers Conference, Real Time Microconference, Aug. 31, 2012, 31 pages.

P. McKenney, "The new visibility of RCU processing", LWN.net, Oct. 10, 2012, 4 pages.

P. McKenney, "CPU, Hotplug, RCU, and big.LITTLE", Linaro Connect, Nov. 1, 2012, 33 pages.

P. McKenney, Bare-Metal Multicore Performance in a General-Purpose Operating System, Multicore World, Feb. 2013, 66 pages.

P. McKenney, "Simplifying RCU", LWN.net, Mar. 6, 2013.

P. McKenney, "User-space RCU", LWN.net, Nov. 13, 2013, 15 pages.

J. Corbet, "The RCU-tasks subsystem", LWN.net, Jul. 30, 2014.

P. McKenney, "The RCU API, 2014 Edition", LWN.net, Sep. 4, 2014.

P.McKenney, "What Happens When 4096 Cores All Do synchronize_rcu_expedited( )?", linux.conf.au, Geelong, Australia, Feb. 3, 2015.

L. Lian et al., "Verification of the Tree-Based Hierarchical Read-Copy Update the Linux Kernel", Cornell University Library, pp. 1-14, Oct. 11, 2016.

A. Podzimek, "Read-Copy-Update for OpenSolaris", Charles University, 2010, 90 pages.

Matveev et al., "Read-Log-Update: A Lightweight Synchronization Mechanism for Concurrent Programming", published Nov. 4, 2016 (16 pages).

Prasad et al., "A Frugal Approach to Reduce RCE Grace Period Overhead", published Apr. 26, 2018 (16 pages).

P. McKenney, "A Tour Through RCE's Requirements", LWN.net (2015) (36 pages).

P. McKenney, "scru: Parallelize Callback Handling", [PATCH/tip/core/rcu 40/40], Apr. 12, 2017 (21 pages).

P. McKenney, "Prevent sdp->srcy_gp_seq_needed counter wrap", [tip:core/rce], Jun. 13, 2017 (3 pages).

* cited by examiner

FUNNEL LOCKING FOR SLEEPABLE READ-COPY UPDATE

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer ( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference ( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed to be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. In modern kernel-based RCU implementations, a quiescent state is typically delineated by a kernel code path being outside an RCU read-side critical section. RCU read-side primitives such as rcu_read_lock ( ) and rcu_read_unlock ( ) are commonly used by the readers to denote the beginning and end of such critical sections.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

In some RCU implementations, such as versions of the Linux® kernel, there is an RCU flavor denominated "Sleepable" RCU or "SRCU." SRCU allows readers to block or sleep during their RCU read-side critical sections. This is not allowed in classic RCU implementations because arbitrary sleeping within RCU read-side critical sections could indefinitely extend grace periods. This could result in arbitrarily large amounts of memory awaiting the end of a grace period, which could result in system hangs due to memory exhaustion.

The strategy employed by SRCU is to isolate RCU grace-period detection within separate subsystems of the operating system kernel so that memory reclamation by SRCU updaters in one subsystem is not blocked by SRCU readers in other subsystems, and vice versa. Each subsystem may have a bounded number of available memory blocks that is less than the total number of memory blocks available system-wide. Example operating system subsystems for which SRCU may be used include virtualization, memory management, file systems, block I/O, drivers, etc. Each subsystem using SRCU creates a struct srcu_struct data structure as exemplified by FIG. 4.

FIG. 4 depicts a conventional struct srcu_struct structure. The srcu_struct structure contains various fields that support update-side SRCU processing and other fields that support read-side SRCU processing. The update-side fields of the srcu_struct structure include →completed, →srcu_gp_seq, →queue_lock, →srcu_cblist and →work. The →completed field stores the grace period number of the most recently-completed SRCU grace period. The →srcu_gp_seq field stores a grace period sequence number that comprises both the grace period number and phase of the currently in-progress SRCU grace period.

The →srcu_cblist field is a data structure used to maintain a centralized segmented callback list. It contains a →head pointer that references the first callback (or is NULL if the callback list contains no callbacks) and four tail pointers that define the callback list segments. The →tails[RCU_DONE_TAIL] pointer references the end of a first callback list segment named RCU_DONE_TAIL for callbacks whose grace periods have elapsed. The →tails[RCU_WAIT_TAIL] pointer references the end of a second callback list segment named RCU_WAIT_TAIL for callbacks that are waiting for the current grace period to end. The →tails [RCU_NEXT_READY_TAIL] pointer references the end of a third callback list segment named RCU_NEXT_READY_TAIL for callbacks that are waiting for the next grace period to start. The →tails [RCU_NEXT_TAIL] pointer references the end of a fourth callback list segment named RCU_NEXT_TAIL for callbacks that have not yet been associated with a grace period. The →srcu_cblist callback list structure also maintains a four-element →gp_seq array that records grace period sequence numbers corresponding to the callback list segments. This allows different CPUs to have different ideas as to what is the current grace period while avoiding premature invocation of their callbacks. CPUs that go idle for extended periods can thus determine which of their callbacks are ready to be invoked after reawakening.

The →queue_lock field serializes access to the →srcu_cblist callback list by SRCU updaters. The →work field is a workqueue for scheduling a workqueue handler to drive a newly started grace period to completion.

The read-side fields of the srcu_struct structure include →completed and →per_cpu_ref. As noted above, the →completed field tracks the most recently-completed grace period. The →per_cpu_ref field is a centralized pointer to a set of two-element, per-CPU counter arrays. An SRCU reader performs a counter increment each time it enters or leaves an SRCU read-side critical section. The SRCU reader uses the low order bit of the →completed field to select which counter to increment when it enters its SRCU read-side critical section. This low order bit is stored by the SRCU reader as an index when it enters the SRCU read-side critical section so that the same counter will be incremented when the SRCU reader leaves the SRCU read-side critical section. SRCU's grace period processing mechanism monitors the counter values for a particular index to determine when it is safe to end the SRCU grace period that corresponds to that index. When an old SRCU grace period ends and a new SRCU grace period begins, the index selector bit flips and SRCU readers entering their SRCU read-side critical sections after that point begin incrementing the counters designated by the other index.

SRCU has been historically used for low-update-rate situations, so its callback handling consists of a single segmented callback queue that is implemented by RCU's →srcu_cblist structure, with insertions being protected by the srcu_struct structure's →queue_lock. This has worked quite well, but may not be satisfactory if a particular srcu_struct structure is used in an environment that results in high contention on that structure's →queue_lock due to excessive callback posting by SRCU updaters.

It would therefore be desirable to provide an SRCU mechanism that improves the scalability of SRCU's callback handling operations.

SUMMARY

A method, system and computer program product implement a funnel locking technique for improving scalability of callback handling while mediating grace-period-start requests in a sleepable read-copy update (SRCU) environment. The disclosed technique may include:

implementing an SRCU environment characterized by an ability of SRCU readers to sleep within respective SRCU read-side critical sections while SRCU updaters post SRCU callbacks representing requests for deferred destruction of shared data elements, and further characterized by isolation of SRCU grace-period detection within a subsystem of a computer software system so that memory reclamation by SRCU updaters in the subsystem is not blocked by SRCU readers in other subsystems;

the SRCU environment storing in a memory a set of per-CPU data structures that each maintain a list of SRCU callbacks enqueued by the SRCU updaters;

the SRCU environment storing in the memory an SRCU management data structure that maintains a current-grace-period record that tracks a current SRCU grace period, and a future-grace-period record that tracks a farthest-in-the-future SRCU grace period needed by the SRCU callbacks enqueued by the SRCU updaters;

the SRCU environment storing in the memory a combining tree for mediating a plurality of grace-period-start requests concurrently vying for an opportunity to update the future-grace-period record of the SRCU maintenance data structure;

the grace-period-start requests being issued on behalf of the SRCU callbacks to a leaf level of the combining tree and propagating toward a single root node of the combining tree;

the future-grace-period record of the SRCU management data structure being updated as needed in response to the grace-period-start requests reaching the root node of the combining tree; and the current-grace-period record of the SRCU management data structure being updated to start a new SRCU grace period in response to the grace-period-start requests reaching the root node of the combining tree if the SRCU grace period recorded in the future-grace-period record has not already completed and there is no SRCU grace period in progress.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1A:
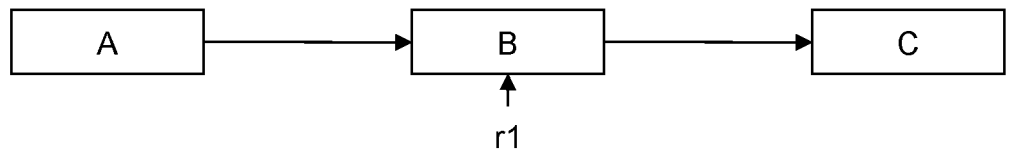
FIGS. 1A-1D are diagrammatic representations of a linked list of data elements undergoing a data element replacement according to a prior art read-copy update mechanism.
Figure 1B:
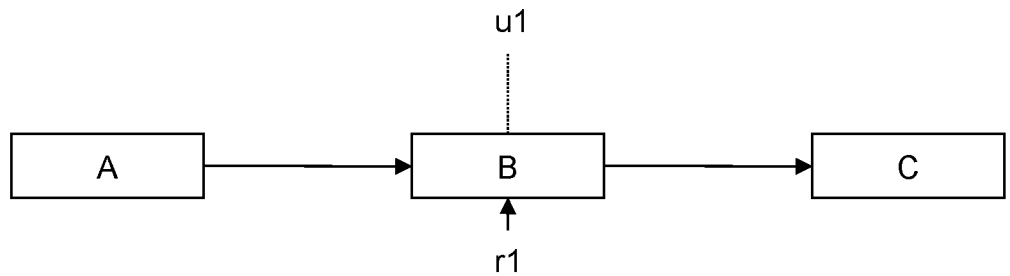
Figure 1C:
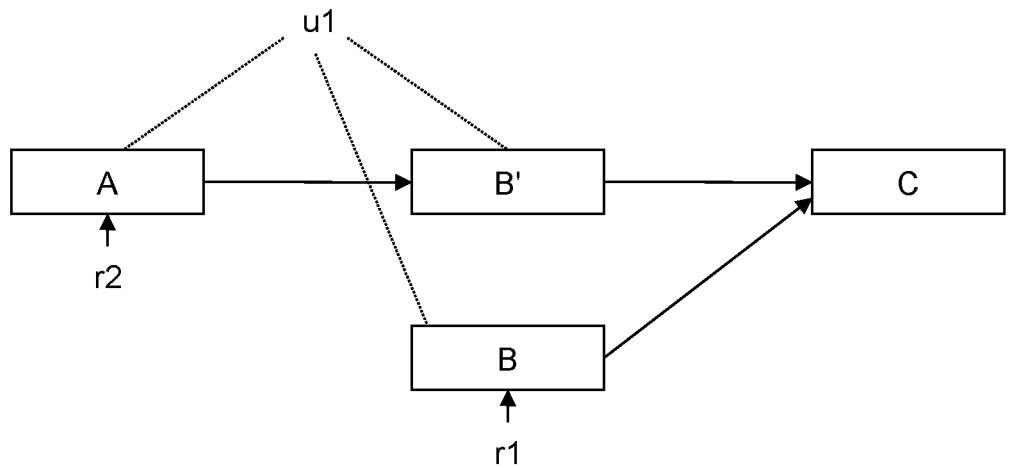
Figure 1D:
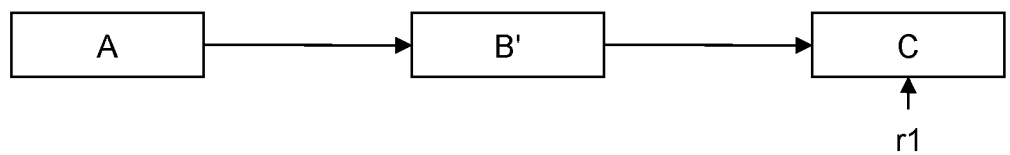
Figure 2A:
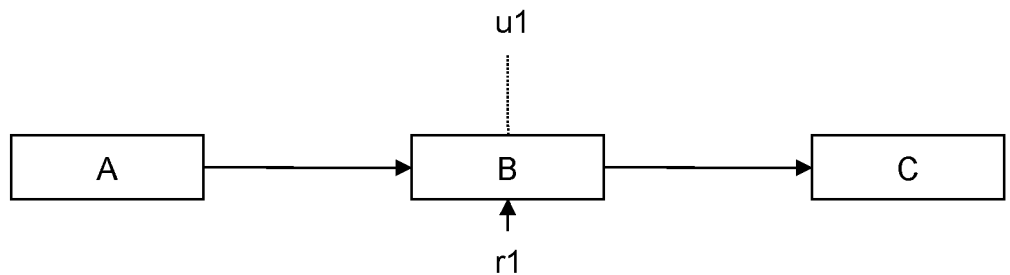
FIGS. 2A-2C are diagrammatic representations of a linked list of data elements undergoing a data element deletion according to a prior art read-copy update mechanism.
Figure 2B:
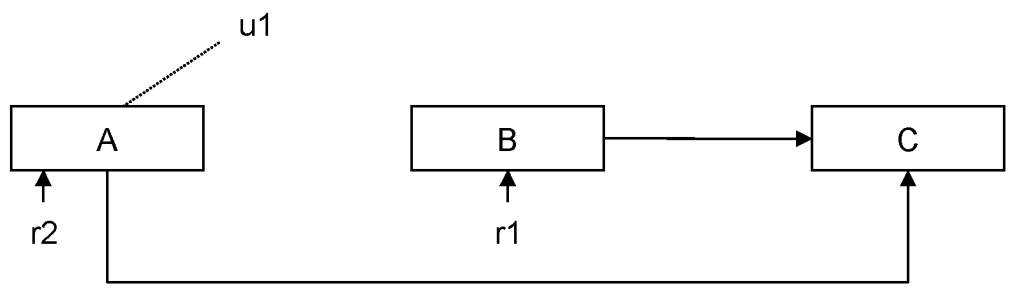
Figure 2C:
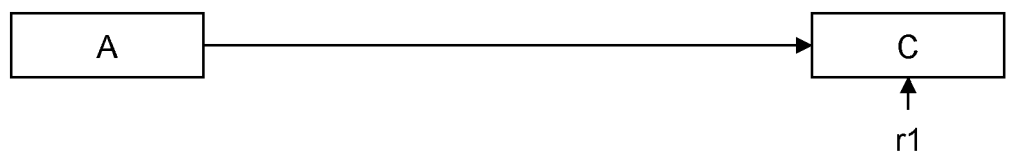
Figure 3:
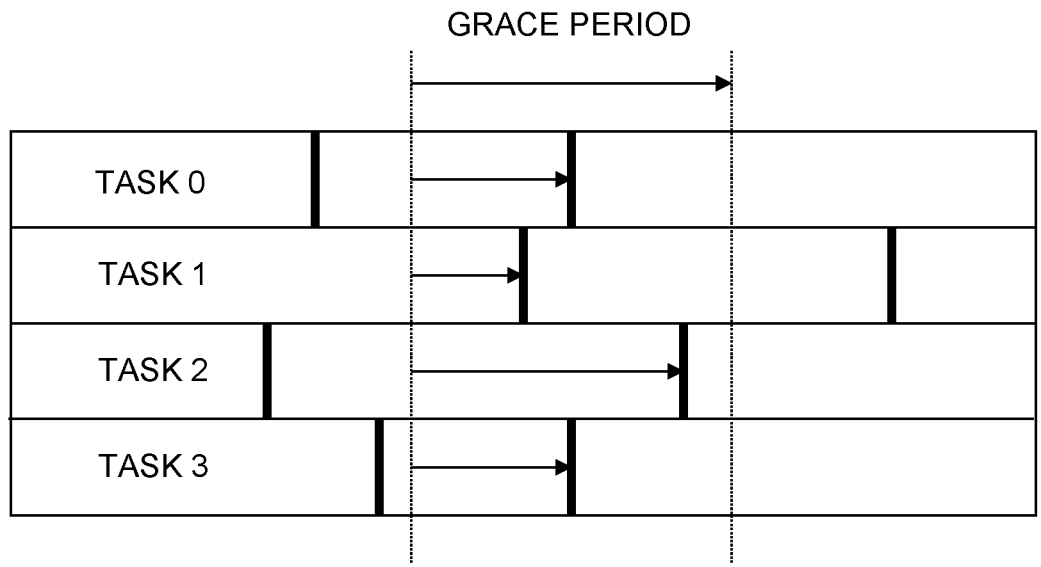
FIG. 3 is a flow diagram illustrating an example prior art grace period in which four processes pass through a quiescent state.
Figure 4:
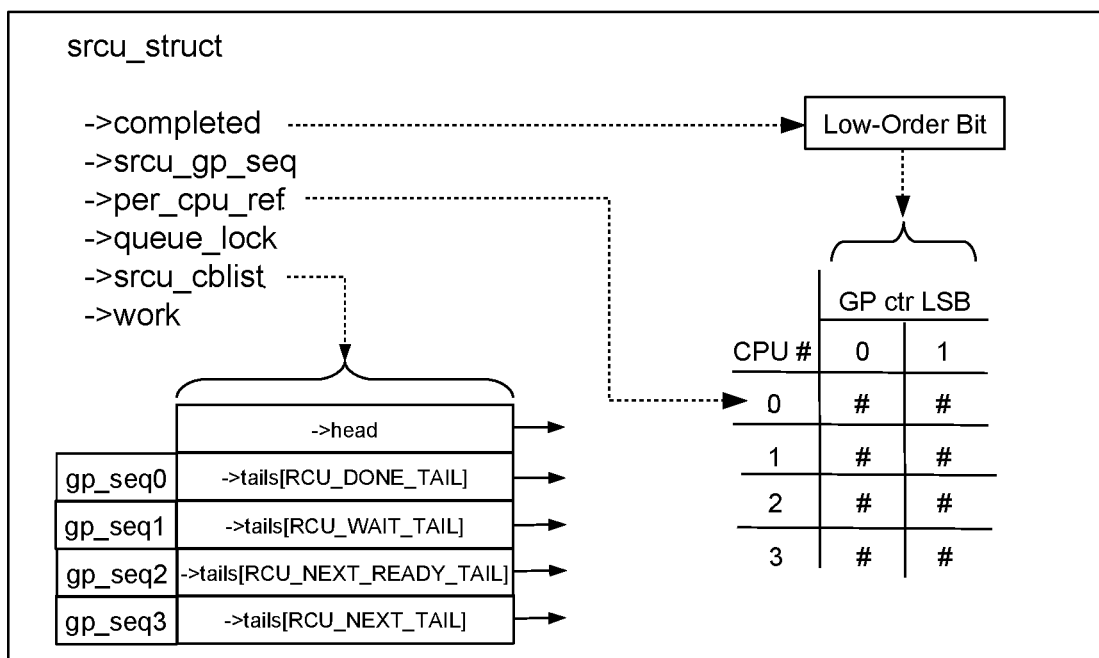
FIG. 4 is a functional block diagram showing an example srcu_struct structure of a prior art SRCU implementation.

Turning now to the figures, wherein like reference numerals represent like elements in all of the several views, FIG. 4 illustrates an example multiprocessor computer system in which a funnel locking technique for improving scalability of callback handling while mediating grace-period-start requests in a sleepable read-copy update (SRCU) environment may be implemented. In FIG. 4, a computer system 2 may include a plurality of processors $4_1, 4_2 \ldots 4_n$, a system bus 6, and a program memory 8. There may also be cache memories $10_1, 10_2 \ldots 10_n$ and cache controllers $12_1, 12_2 \ldots 12_n$ respectively associated with the processors $4_1, 4_2 \ldots 4_n$. A memory controller 14 may be associated with the memory 8. As illustrated, the memory controller 14 may reside separately from processors $4_1, 4_2 \ldots 4_n$, for example, as part of a discrete chipset. Alternatively, the memory controller 14 could be provided by plural memory controller instances that are respectively integrated with the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 may run periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a sleepable read-copy update (SRCU) subsystem 20 as part of their processor functions. In FIG. 4, reference numbers $20_1, 20_2 \ldots 20_n$ represent individual RCU instances that may respectively periodically execute on the several processors $4_1, 4_2 \ldots 4_n$. Operational details of the SRCU subsystem 20 are described below.

Any given processor 4 may also periodically execute read operations (readers) 21. Each reader 21 may run from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may invoke the SRCU subsystem 20 to track an SRCU grace period for deferred destruction of the pre-update view of the data (second-phase update).

Figure 5:
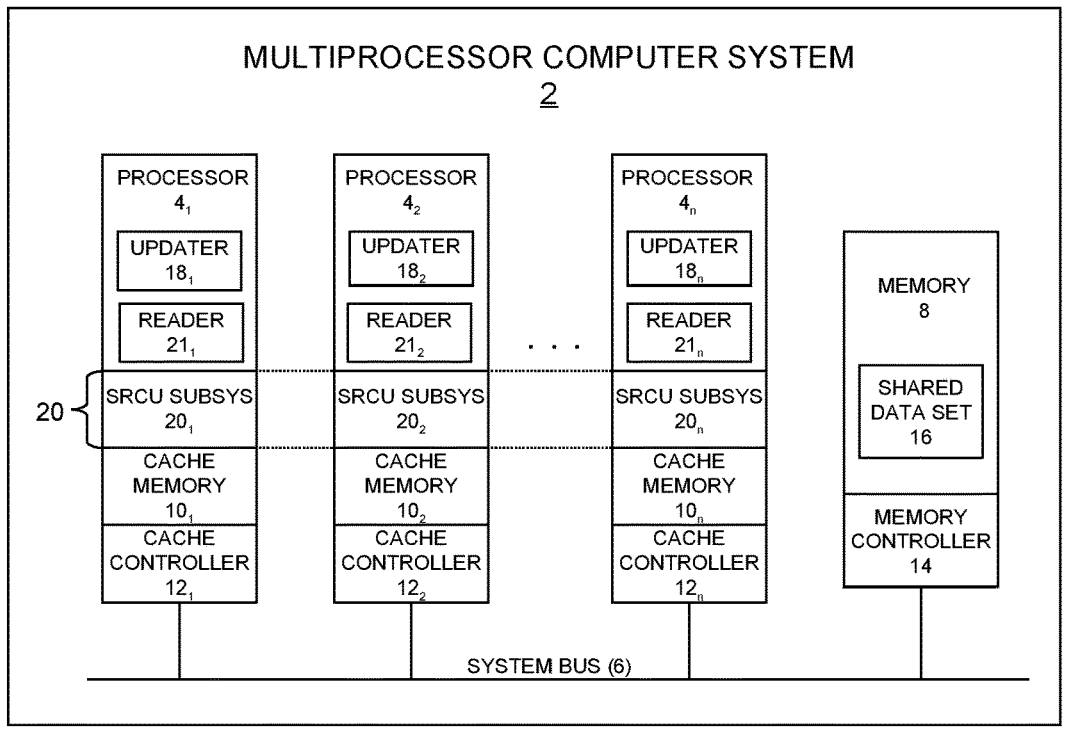
FIG. 5 is a functional block diagram showing a multiprocessor computing system that implements SRCU funnel locking in accordance with the present disclosure.

Turning now to FIG. 5, example components of the SRCU subsystem 20 are shown. Among these components is a set of SRCU subsystem support functions 30, namely, an SRCU reader API (Application Programming Interface) 32, an SRCU updater API 34, and SRCU grace period processing and callback invocation functionality 40.

The SRCU reader API 32 may include a reader registration component and a reader unregistration component that are respectively invoked by readers 21 as they enter and leave their RCU read-side critical sections to read shared data 16. This allows the SRCU subsystem 20 to track reader operations and determine when readers are engaged in SRCU-protected read-side critical section processing. In an example embodiment, the reader registration and unregistration components may be respectively implemented using modified versions of the srcu_read_lock ( ) and srcu_read_unlock ( ) primitives found in existing SRCU implementations. These modified versions of the srcu_read_lock ( ) and srcu_read_unlock ( ) primitives differ from their prior art counterparts in that the counters they manipulate are referenced via per-cpu srcu_data structures (see below) rather than from a centralized srcu_struct structure (as described in the Background section above).

The SRCU updater API 34 may include an SRCU callback registration component 36 and an SRCU funnel lock processing component 38. Example operations that may be performed by these components are described below in connection with FIGS. 8 and 9A-9B, respectively.

The SRCU grace period processing and callback invocation functionality 40 is responsible for managing SRCU grace periods and invoking SRCU callbacks whose grace periods have ended. Example operations that may be performed while implementing these functions are described in more detail below.

Figure 7:
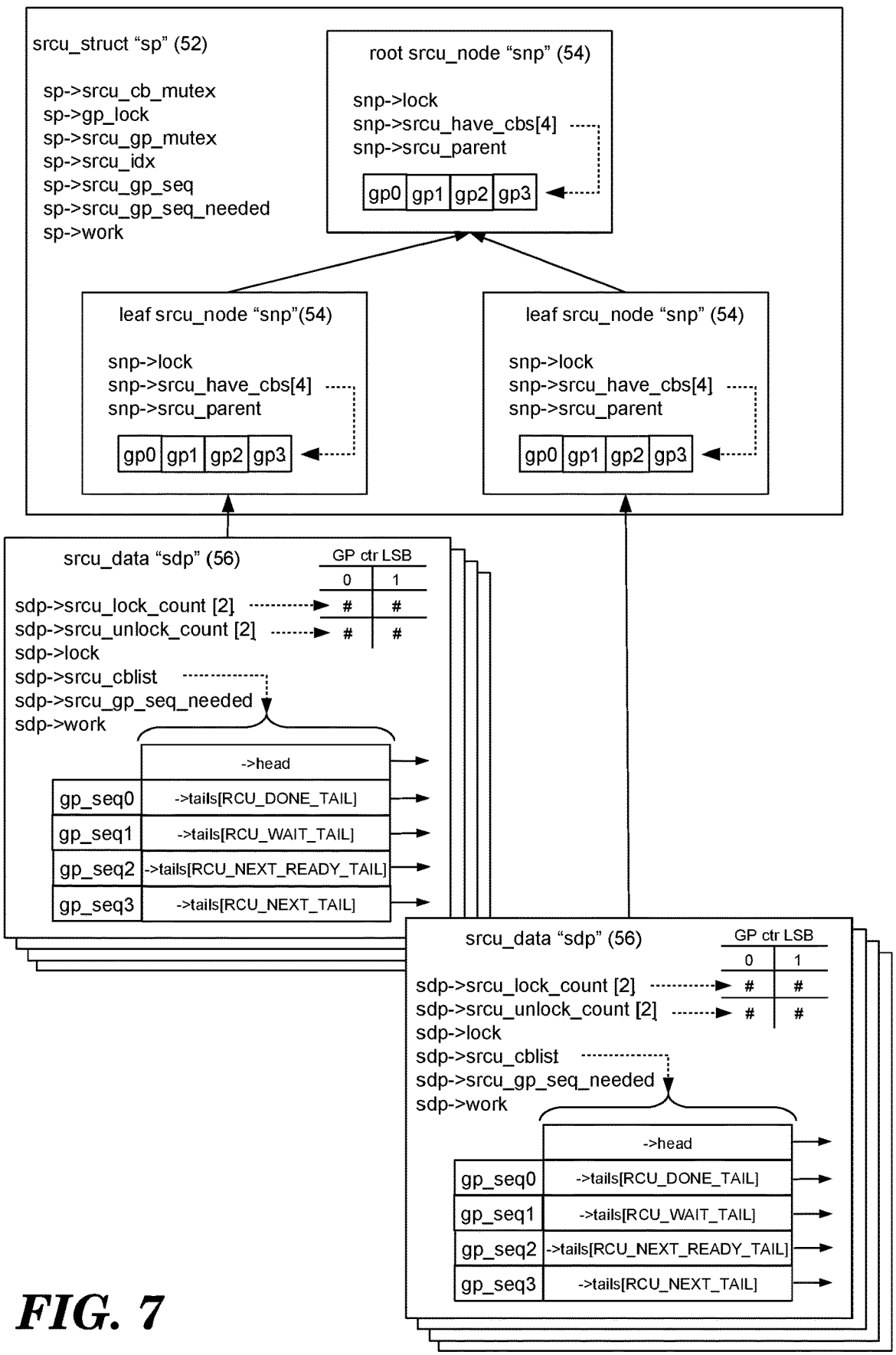
FIG. 7 is a functional block diagram showing example data structures of the SRCU subsystem of FIG. 6.

The SRCU subsystem 20 may further include a set of SRCU subsystem data structures 50. These data structures may include an srcu_struct structure 52, serving as an SRCU management data structure, and representing a modified version of the srcu_struct structure described in the Background section above. For ease of understanding, the srcu_struct structure 52 will be referred to as "sp" when describing the various fields (a.k.a. records) thereof. The srcu_struct structure may have embedded therein (e.g., as a linear array) a combining tree of srcu_node structures 54. An example two-level tree of srcu_node structures 54 is shown in FIG. 7. By way of example only, the combining tree of FIG. 7 may include one root srcu_node structure 54 and two leaf srcu_node structures 54. Additional srcu_node levels may be provided as needed. For ease of understanding, the srcu_node structures 54 will be referred to as "snp" when describing the various fields (a.k.a. records) thereof (see below).

Each leaf srcu_node structure 54 has a set of a per-CPU srcu_data structures 56 assigned to it. Each srcu_data structure 56 may represent one CPU in the computer system 2 and may be used to maintain SRCU-related information specific to that CPU. For ease of understanding, the srcu_data structure 52 will be referred to as "sdp" when describing the various fields (a.k.a. records) thereof (see below). As briefly mentioned above, these fields include a pair of per-CPU counter arrays (sdp→srcu_lock_count [2] and sdp→srcu_unlock_count [2]) for use by the readers 21 as they enter and leave their SRCU read-side critical sections. Each rcu_data structure 56 also maintains a per-CPU SRCU callback list (sdp→srcu_cblist) for use by the updaters 18 in lieu of the centralized callback list→srcu_cblist found in the conventional srcu_struct structure of FIG. 4. This means that SRCU callback requests by updaters 18 in the computer system 2 may be parallelized across CPUs that run the updaters, which greatly improves the scalability of SRCU's callback handling as compared to the prior art approach.

A challenge arising from the use of per-CPU SRCU callback lists is the need to ensure that SRCU callbacks are reliably invoked at the end of their corresponding grace period. This is not a problem when a single centralized SRCU callback list is used (as per FIG. 4) because the callback list (→srcu_cblist) and the SRCU grace period sequence number (→srcu_gp_seq) are maintained in one location, namely the srcu_struct structure. A conventional SRCU implementation is thus immediately aware of each SRCU callback's grace period sequence number when the callback is enqueued.

Figure 6:
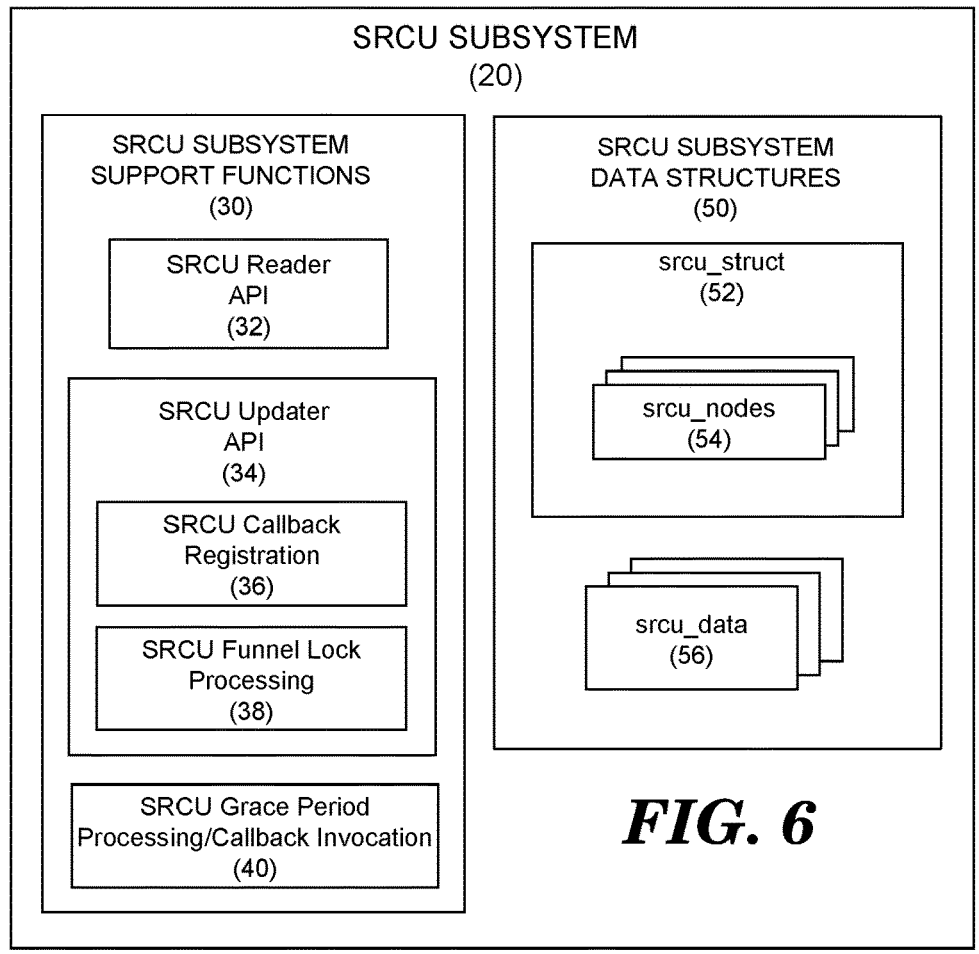
FIG. 6 is a functional block diagram showing an example SRCU subsystem that may be provided in the computer system of FIG. 5.

In contrast, the new SRCU subsystem 20 of FIG. 6 bifurcates the tracking of SRCU grace period sequence numbers (which continues to take place in the srcu_struct structure) from the tracking of SRCU callbacks (which now takes place in the per-CPU srcu_data structures). In FIG. 7, an updater 18 enqueuing a new SRCU callback on an srcu_data structure 56 needs to advise the srcu_struct structure 52 if a new SRCU grace period is needed. However, it is possible in a modern preemptible operating system that the updater 18 could be blocked for an arbitrarily large number of SRCU grace periods just after completing the enqueue operation but before it is able to advise the srcu_struct structure 52 that a new grace period is needed.

In the SRCU subsystem 20 of FIG. 6, callback posting and advising of the need for new grace periods are handled in a different manner that utilizes the srcu_node tree of FIG. 7. A funnel-locking technique is used to scalably mediate grace-period-start requests issued on behalf of newly-enqueued SRCU callbacks by the CPUs that post the callbacks. When an SRCU callback is enqueued using an srcu_data structure's SRCU callback list (sdp→cblist), the callback's future invocation time SRCU grace period number is computed using the current SRCU grace period sequence number stored in an sp→srcu_gp_seq field of the srcu_struct structure 52. For ease of description, this future SRCU grace period number will be referred to as "s." The future SRCU grace period number s is checked against a local srcu_data structure field named sdp→srcu_gp_seq needed to see if a new SRCU grace period represented by s has already been requested. If it has, nothing more need be done. Otherwise, the local sdp→srcu_gp_seq needed field is updated and a grace-period-start request for the SRCU grace period represented by s is issued to a leaf-level srcu_node structure 54 of the srcu_node combining tree and propagated toward the root srcu_node structure.

At the leaf-level srcu_node structure 54, the updater 18 checks the appropriate element of an SRCU grace period counter array named snp→srcu_have_cbs [ ] to determine if the SRCU grace period represented by s has already completed. If it has, the updater 18 needs to take steps to cause the SRCU callbacks associated with the completed grace period to be invoked. This is because the SRCU callbacks might not have been by the SRCU grace period processing and callback invocation functionality 40 (FIG. 6), which may have been ignorant of their existence. This check is made because the updater 18 could have been delayed for an arbitrarily long time between enqueuing its SRCU callback and checking the leaf srcu_node structure 54. If the above-described condition is found to exist, no further srcu_node tree traversal work is performed. Otherwise, the SRCU grace-period-start request is propagated up the rcu_node tree until the request is either found to have been already recorded in the srcu_struct structure 52 (in which case the rcu_node tree traversal may be terminated) or until the root srcu_node structure 54 at the top of the tree is reached. In the latter case, if there is no SRCU grace period in progress, a new one is started. If there is an SRCU grace period already in progress, that grace period will start another upon completion.

Example fields of the srcu_struct structure 52, the srcu_node structures 54, and the srcu_data structures 56 will now be described in more detail with reference to FIG. 7. Turning first to the srcu_struct structure 52, the sp→srcu_cb_mutex field prevents later SRCU grace periods from getting ahead of previous SRCU grace periods during the initialization step for callback invocation. Acquisition of the sp→srcu_cb_mutex does not protect any data, but instead prevents more than one additional SRCU grace period from starting while the SRCU subsystem 20 is initiating callback invocation. This allows the snp→srcu_have_cbs [ ] array of the srcu_node structures 54 to have a finite number of elements. The sp→gp_lock field of the srcu_struct structure 52 protects the integrity of the sp→srcu_gp_seq and sp→srcu_gp_seq needed fields (see below) of the srcu_struct structure. The sp→srcu_gp_mutex field of the srcu_struct structure 52 is used to serialize SRCU grace period processing work. The sp→srcu_idx field of the srcu_struct structure 52 is for use by the readers 21. It indicates the current active element of the sdp→srcu_lock_count [2] and sdp→srcu_unlock_count [2] arrays maintained by the srcu_data structures 56. As previously noted, these arrays are used by the readers 21 as they enter and leave their SRCU read-side critical sections.

The sp→srcu_gp_seq field of the srcu_struct structure 52 maintains a grace period sequence number that indicates the grace period number and phase of the SRCU grace period that is currently in effect. The phase (e.g., grace period idle, grace period started, grace period ending) is indicated by the two low-order bits and the grace period number is represented by the remaining higher-order bits. The sp→srcu_gp_seq needed field of the srcu_struct structure 52 records the SRCU grace period number of the furthest-in-the-future grace-period-start request that has propagated to the root of the srcu_node tree. The sp→work field of the srcu_struct structure 52 is used to schedule deferred callback invocation work by kernel workqueues.

As previously noted, the future SRCU grace period number s is calculated from the SRCU grace period sequence number stored in the sp→srcu_gp_seq field of the srcu_struct structure 52. In an embodiment, s may have its two low-order bits cleared to 00, such that the grace period phase portion of the grace period sequence number is not utilized. Only the remaining high-order bits representing the actual SRCU grace period number will have meaning. In an embodiment, the sp→srcu_gp_seq needed field of the srcu_struct structure 52 utilizes the same bit format.

Turning now to the rcu_node structures 54, the snp→lock field is used to serialize access to the rcu_node structure by the updaters 18. An snp→srcu_parent field contains a pointer to the rcu_node structure's parent node in the rcu_node tree. The snp→srcu_have_cbs [ ] array of each srcu_node structure 54 tracks the furthest-in-the-future grace period needed by any SRCU callback under the jurisdiction of that srcu_node structure. In an embodiment, the snp→srcu_have_cbs [ ] array has four elements that store different SRCU grace period numbers, thereby allowing requests for four different SRCU grace periods to be tracked concurrently while bounding contention. As noted above, the rcu_struct structure's sp→srcu_cb_mutex field, which prevents more than one additional grace period from starting while the SRCU subsystem 20 is initiating callback invocation, allows the snp→srcu_have_cbs [ ] array of the srcu_node structures 54 to have a finite number of elements.

In an embodiment, the grace period restrictions imposed by the rcu_struct structure's sp→srcu_cb_mutex field result in no more than three different SRCU grace periods needing to be tracked, such that the number of snp→srcu_have_cbs [ ] array elements actually required is three. However, using a four element array allows more efficient array index calculations. By way of example, the three array elements used for tracking different SRCU grace periods may respectively track a just-completed SRCU grace period (for srcu_data structures 56 having SRCU callbacks that are ready to be invoked), a current SRCU grace period (for srcu_data structures 56 having SRCU callbacks waiting on the current grace period), and a next SRCU grace period following the current one (for srcu_data structures 56 having SRCU callbacks waiting on the next grace period).

The SRCU grace period number stored in each snp→srcu_have_cbs [ ] array element may initially have the same bit format as the future SRCU grace period s; namely, the two low-order bits may be cleared to 00 and the remaining high-order bits may store the actual SRCU grace period number. In an embodiment, the bottom bit of each snp→srcu_have_cbs [ ] array element may serve as a grace-period-completion bit. This bit may remain in the cleared state while waiting for the array element's associated SRCU grace period to complete. The bit may be set to 1 once the associated SRCU grace period has completed in order to inform excessively delayed SRCU updaters that they must take responsibility for invoking the callbacks they enqueued. The setting of this bit may be handled by the SRCU grace period processing and callback invocation functionality 40 (FIG. 6). As previously mentioned, resolution of the race between SRCU callback posting and SRCU grace period completion (as determined from the grace-period-completion bit) may be handled at the leaf level of the srcu_node tree.

Turning now to the srcu_data structures 56, the sdp→srcu_lock_count [ ] array and the sdp→srcu_unlock_count [ ] array contain counters that are respectively incremented by the readers 21 as they enter and leave their SRCU read-side critical sections. Thus, the srcu_read_lock ( ) primitive of the SRCU reader API 32 (FIG. 6) may be invoked by an SRCU reader 21 to increment one of the sdp→srcu_lock_count [ ] counters at the beginning of an SRCU read-side critical section. Similarly, the srcu_read_unlock ( ) primitive of the SRCU reader API 32 (FIG. 6) may be invoked by an SRCU reader to increment one of the sdp→srcu_unlock_count [ ] counters at the end of an SRCU read-side critical section. As previously indicated, these counter arrays serve the same purpose as the per_cpu_ref counter arrays of the conventional srcu_struct structure shown in FIG. 4, except that the presently-disclosed counter arrays are referenced on a per-CPU basis instead of via a centralized pointer in the srcu_struct structure itself (i.e., the →per_cpu_ref pointer shown in FIG. 4). In FIG. 7, the value stored in the srcu_struct structure's sp→srcu_idx field determines which element of the sdp→srcu_unlock_count [ ] arrays is to be used during a given SRCU grace period.

As previously discussed, the sdp→srcu_cblist field of each srcu_data structure 56 represents a per-CPU SRCU callback list that corresponds to the centralized SRCU callback list of the same name (i.e., →srcu_cblist) discussed in the Background section above in connection with the conventional srcu_struct structure shown in FIG. 4. The sdp→srcu_cblist field thus contains SRCU callbacks in association with the SRCU grace period numbers that determine when the callbacks may be invoked. As noted above, the sdp→srcu_gp_seq needed field of each srcu_data structure records the farthest-in-the-future grace period requested for that srcu_data structure. It may have the same bit format as the future SRCU grace period number s. The sdp→srcu_gp_seq_needed field reduces contention on the leaf srcu_node structures 54 insofar as an updater 18 will only traverse the srcu_node tree if a check of this field reveals that a future SRCU grace period needed by a newly-posted SRCU callback has not yet been requested. The sdp→work field of the srcu_data structures provides a kernel workqueue context for invoking SRCU callbacks.

Figure 8:
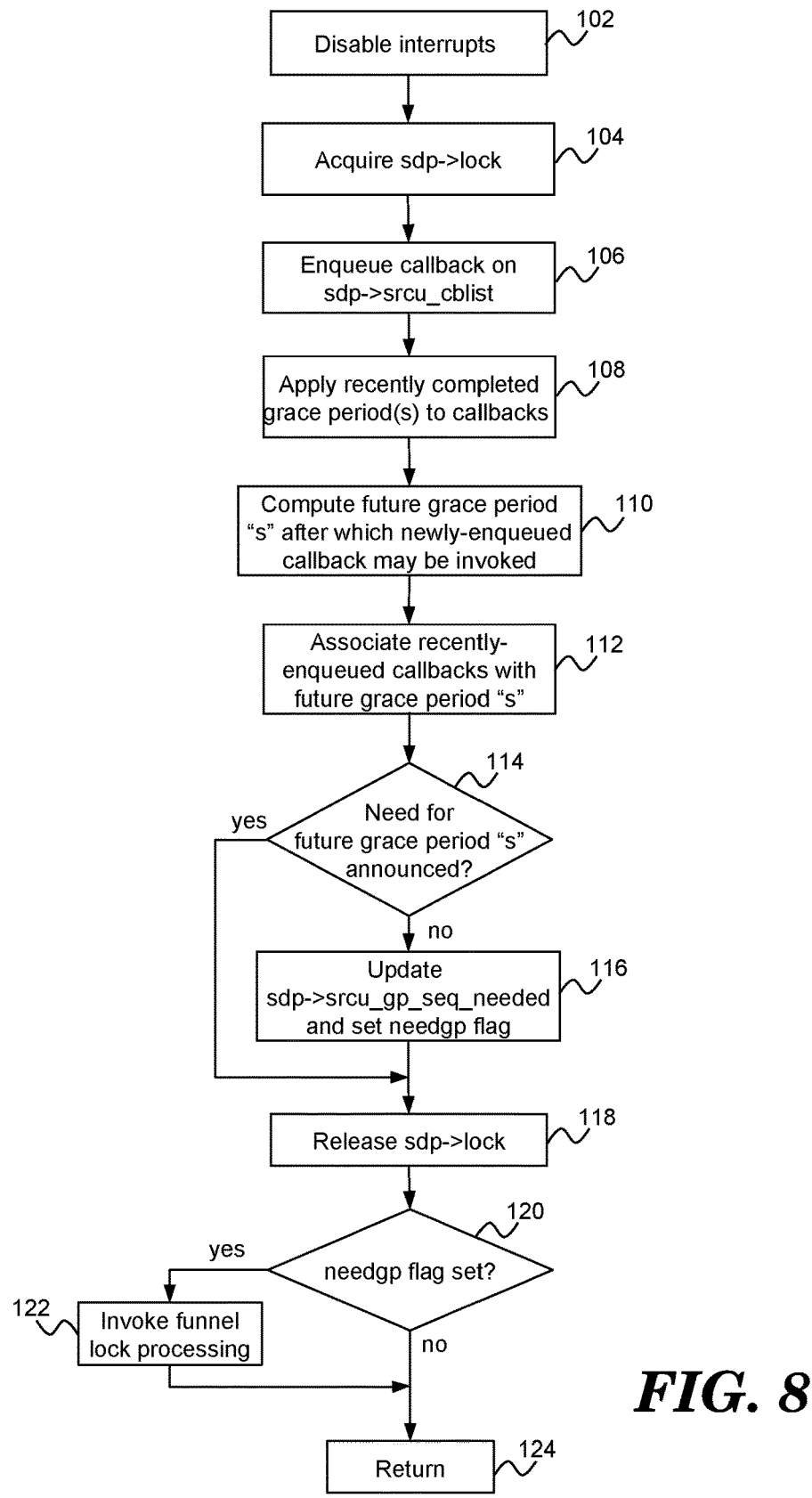
FIG. 8 is a flow diagram illustrating example SRCU callback registration processing that may be performed in accordance with the present disclosure.

Turning now to FIG. 8, a high-level description is shown of the first stage of an example funnel-locking technique for SRCU. This first stage represents operations of the SRCU callback registration component 36 (see FIG. 6), which may be invoked by the updaters 18 in order to register SRCU callbacks at srcu_data structures associated with the CPUs that run the updaters. By way of example only, the SRCU callback registration procedure may represent a modified version of the conventional call_srcu ( ) primitive.

Block 102 of FIG. 8 disables interrupts and block 104 acquires the srcu_data structure's sdp→lock. Block 106 enqueues a new SRCU callback at the end of the RCU_NEXT_TAIL portion of the srcu_data structure's SRCU callback list (sdp→srcu_cblist), updating the →tails [RCU_NEXT_TAIL] pointer as it does so. In an embodiment, an existing Linux kernel® RCU function named rcu_segcblist_enqueue ( ) may be used for this operation. Block 108 advances callbacks on the srcu_data structure's SRCU callback list based on the current grace period sequence number stored in the srcu_struct structure's sp→srcu_gp_seq field. In an embodiment, an existing Linux kernel® RCU function named rcu_segcblist_advance ( ) may be used for this operation. This function finds all callbacks on a segmented RCU callback list whose →gp_seq numbers indicate they are ready to invoke, and puts them into the RCU_DONE_TAIL segment of the callback list.

Block 110 of FIG. 8 computes the future SRCU grace period number s that the newly-enqueued SRCU callback needs to complete in order for the callback to be invoked. An existing Linux kernel® RCU function named rcu_seg_snap ( ) may be used for this operation. In an embodiment, the future SRCU grace period number s computed in block 110 may be one or two grace periods beyond the current SRCU grace period number tracked by the srcu_struct structure's →srcu_gp_seq field. Block 112 associates any recently-enqueued callbacks on the srcu_data structure's SRCU callback list (→srcu_cblist) with the newly-computed future SRCU grace period number s, including the SRCU callback that was enqueued in block 106. An existing Linux kernel® RCU function named rcu_segcblist_accelerate ( ) may be used for this operation.

Block 114 of FIG. 8 compares the current value of the srcu_data structure's sdp→srcu_gp_needed field against the future SRCU grace period number s computed in block 110. If they are equal, it means that this srcu_data structure has previously announced its need for the future SRCU grace period represented by s. Processing may then bypass block 116 and proceed to block 118, which releases the srcu_data structure's sdp→lock. If, on the other hand, block 114 determines that the srcu_data structure has not previously announced its need for the future SRCU grace period represented by s, processing proceeds to block 116, which update's the srcu_data structure's sdp→srcu_gp_seq needed field so that it stores s. As previously noted, this will prevent future redundant grace-period-start requests from being propagated up the rcu_node tree. Block 116 also sets a local flag, which may be named needgp. Following release of the srcu_data structure's sdp→lock in block 118, block 120 checks the local needgp flag. If it is set, block 122 invokes the SRCU funnel lock processing component 38 of FIG. 6. Otherwise, block 124 returns to the caller without invoking funnel lock processing.

Figure 9A:
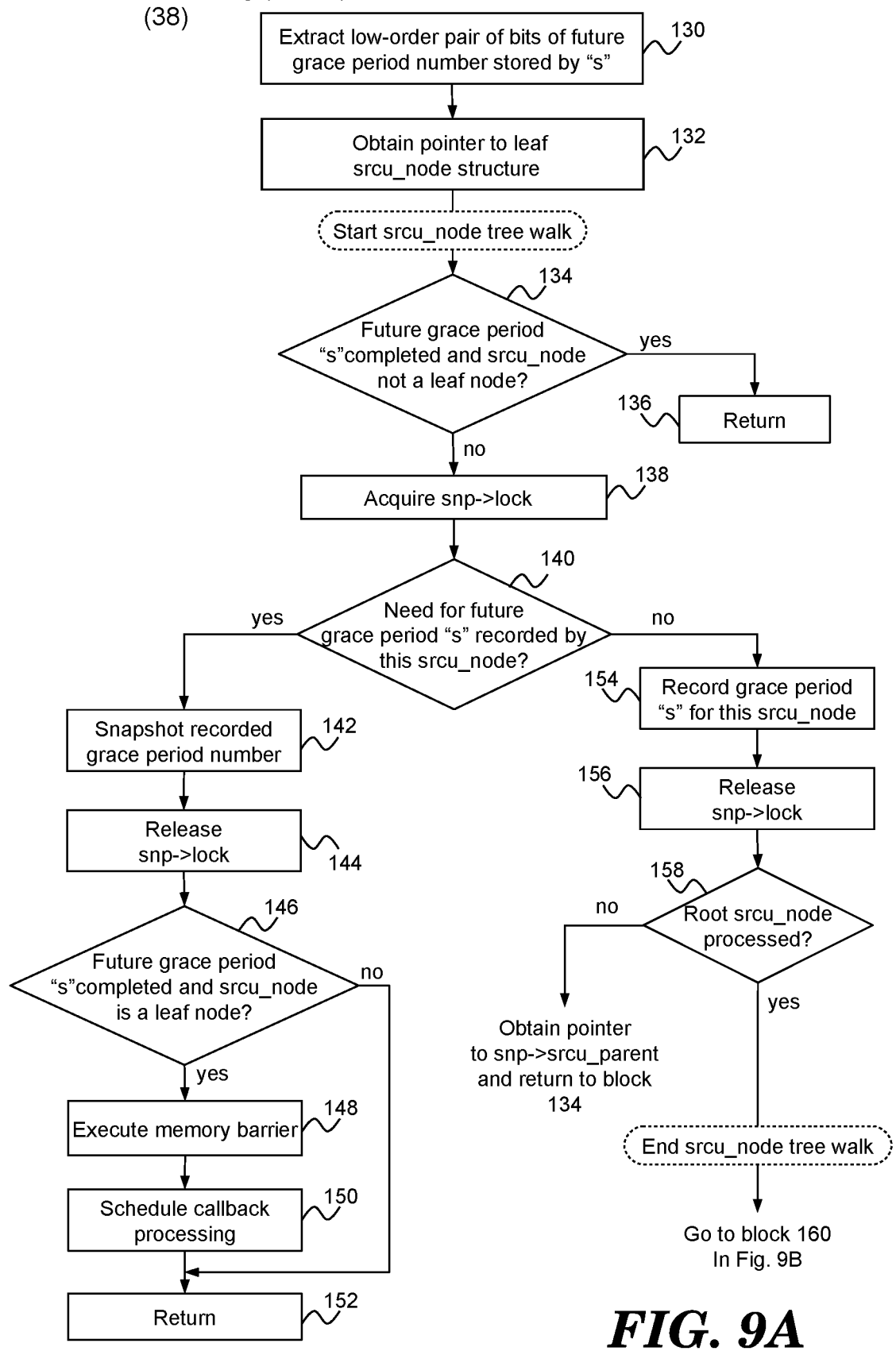
FIGS. 9A and 9B is a two-part flow diagram illustrating example funnel lock processing that may be performed in accordance with the present disclosure.
Figure 9B:
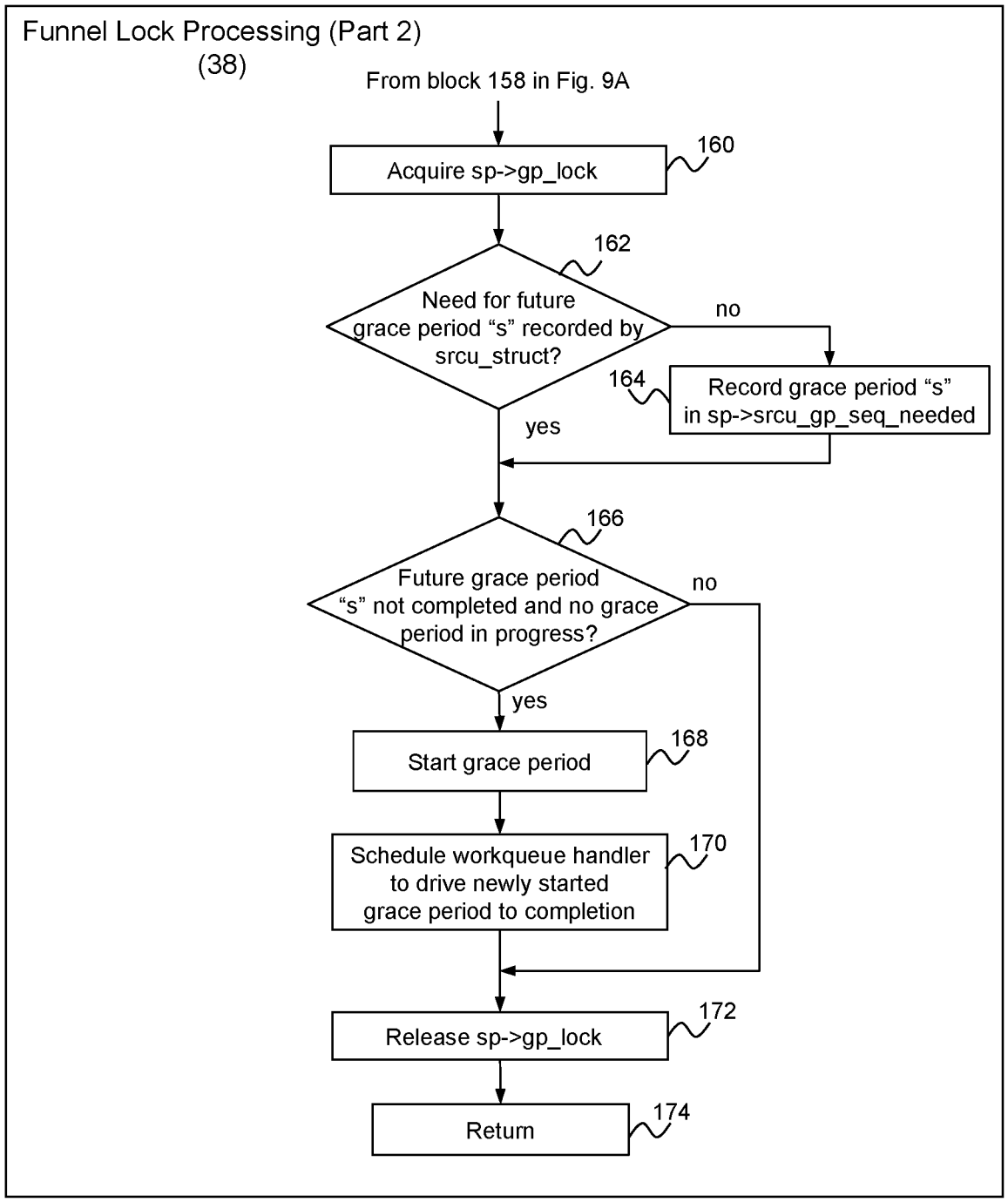

Turning now to FIGS. 9A and 9B, a high-level description is shown of the second stage of an example funnel-locking technique for SRCU. This second stage represents operations of the SRCU funnel lock processing component 38 (see FIG. 6), which is invoked from block 122 of FIG. 8. By way of example only, the SRCU funnel lock processing procedure may be implemented by a new function named srcu_funnel_gp_start ( ).

Block 130 of FIG. 9A extracts the low-order pair of bits of the future SRCU grace period number portion of s computed in block 110 of FIG. 8. Per the previous discussion of the bit format of s, the extracted bits will be the third and fourth low-order bits of the actual data field represented by s, the first and second low-order bits being unused and not part of the grace period number. Block 132 obtains a pointer to the leaf srcu_node structure 54 associated with the current srcu_data structure 56. A walk up the srcu_node tree is then performed by way of a loop that spans blocks 134-158 of FIG. 9A. It is desirable that the majority of srcu_node tree traversals terminate their walk at lower levels of the tree in order to maintain an acceptable level of contention for the snp→lock of the various srcu_node structures. This is accomplished using the snp→srcu_have_cb [ ] arrays. As described in more detail below, only the first grace-period-start request for a given future SRCU grace period number s will proceed further up the tree. All later requests for the same grace period number will terminate their traversal.

Advantageously, by providing an array of snp→srcu_have_cb counters (i.e., four in the illustrated embodiment), concurrent grace-period-start requests for several different SRCU grace periods may be propagated concurrently up the srcu_node tree. As previously discussed, the number of different SRCU grace periods for which concurrent graceperiod-start requests may be issued is constrained by the srcu_struct structure's sp→srcu_cb_mutex, allowing the snp→srcu_have_cbs [ ] array of the srcu_node structures 54 to have a finite number of elements tracking SRCU grace periods. For example, as earlier noted, three array elements of the snp→srcu_have_cbs [ ] array may be used to respectfully track grace-period-start requests for a just-completed SRCU grace period, a current SRCU grace period, and a next-following SRCU grace period.

Block 134 of FIG. 9A checks whether the future SRCU grace period represented by s has already completed. This may be handled by comparing s (as computed in block 110 of FIG. 8) against the current value of srcu_struct structure's sp→srcu_gp_seq field. If the future SRCU grace period indicated by s has completed, and if the current srcu_node structure 54 is not the leaf node, block 136 returns (i.e., to block 124 in FIG. 8). In that case, the need for a future SRCU grace period (and thus the presence of callbacks) will have been recorded on a leaf srcu_node structure 54 (i.e., per blocks 146-150 below), so the SRCU grace period processing and callback invocation functionality 40 (FIG. 6) will subsequently invoke the callbacks. Otherwise, execution continues to block 138 in order to acquire the snp→lock of this srcu_node structure 54.

Block 140 of FIG. 9A checks to see if the need for the future SRCU grace period represented by s has already been recorded on this srcu_node structure 54, in which case the srcu_node tree traversal is done. The foregoing check is handled using the bits extracted in block 130 as an index (idx) to the snp→srcu_have_cbs [ ] array, with the SRCU grace period number stored at this index position being compared to s. If the srcu_have_cbs [idx] grace period number is greater than or equal to s, block 140 produces a "yes" result. In that case, processing proceeds to block 142, which takes a snapshot (snp seq) of the SRCU grace period number stored by srcu_have_cbs [idx]. Block 144 then releases the srcu_node structure's snp→lock. Block 146 checks to see if the future SRCU grace period represented by s has already completed. This may be handled by comparing s to the snapshot snp seq of srcu_have_cbs [idx] taken in block 142. Recalling that the SRCU grace period processing and callback invocation functionality 40 (FIG. 6) will set the bottom state bit of srcu_have_cbs [idx] when the grace period number indicated by srcu_have_cbs [idx] has completed, the check in block 146 will indicate whether the corresponding SRCU grace period has completed or is still in progress, even if the grace period numbers stored by s and snp seq are the same.

If the SRCU grace period represented by s has completed, and if the srcu_node structure 54 is a leaf srcu_node, the SRCU grace period processing and callback invocation functionality 40 (FIG. 6) cannot be relied upon to invoke the srcu_data structure's SRCU callbacks in a timely fashion. In that case, block 148 executes a memory barrier to ensure that callback invocation occurs after the required SRCU grace period has completed, block 150 schedules callback invocation, and block 152 returns to the caller. If block 146 produces a "no" result, it means that the SRCU grace period represented by s has not yet completed, so the updater 18 can count on the SRCU grace period processing and callback invocation functionality 40 (FIG. 6) invoking the SRCU callbacks once the grace period does complete. In that case, block 152 simply returns to the caller.

Execution reaches block 154 of FIG. 9A if the need for the SRCU grace period represented by s has not yet been recorded for this srcu_node structure. Block 154 records s in the appropriate snp→srcu_have_cbs [idx] array element. Block 156 then releases the srcu_node structure's snp→lock, thus preparing for the next pass through the rcu_node tree traversal loop, beginning again at block 134 if block 158 indicates that the root srcu_node structure 54 has not yet been processed.

Assuming the srcu_node tree walk reaches the root srcu_node structure 54, and further assuming that this iteration of the srcu_node tree walk loop results in blocks 154 and 156 being invoked, it means this is the first grace-period-start request for the SRCU grace period represented by s to reach the root of the srcu_node tree. Processing then proceeds from the "yes" branch of block 158 to block 160 in FIG. 9B, which acquires the srcu_struct structure's sp→gp_lock. Block 162 double-checks that this is the first grace-period-start request for the SRCU grace period represented by s by inspecting the srcu_struct structure's sp→srcu_gp_seq needed field. If the sp→srcu_gp_seq needed field stores a grace period number that is less than s, block 164 updates this field by recording s. Block 166 is reached following block 164, or if block 162 determines that the need for the SRCU grace period represented by s has been recorded by the srcu state structure due to sp→srcu_gp_seq needed being →=s. Block 166 checks if the SRCU grace period represented by s has not completed and there is no SRCU grace period in progress. If both conditions are satisfied, block 168 starts the requested SRCU grace period, block 170 utilizes the srcu_struct structure's sp→work field to schedule a kernel workqueue handler to drive the newly started grace period to completion, block 172 releases the srcu_struct structure's sp→gp_lock, and block 174 returns. If block 166 determines that either the SRCU grace period represented by s has completed or there is already a grace period in progress, blocks 168-172 are bypassed and block 174 simply returns. A successful return from block 174 guarantees that the SRCU callback enqueued in block 106 of FIG. 8 will be invoked in due course by the SRCU grace period processing and callback invocation functionality 40 of FIG. 6.

In an embodiment, each srcu_data structure 56 may be scanned periodically to check for counter wrapping of the sp→srcu_gp_seq field while the sdp→srcu_gp_seq needed field is not advanced. This situation could arise if a given CPU never happens to ever start an SRCU grace period. If the CPU were to decide to finally start an SRCU grace period following a wrap of the sp→srcu_gp_seq counter, the state of the sdp→srcu_gp_seq needed counter might make it appear that the CPU has already requested this grace period, which could prevent the grace period from starting. If no other CPU ever started an SRCU grace period again, this would look like a grace-period hang. Even if some other CPU started the needed SRCU grace period, the leaf rcu_node structure 54 may not have a record of the fact that this CPU has a callback pending, which would appear as a very localized grace-period hang. Scanning the sp→srcu_gp_seq counter for wrapping may be performed at the end of grace period processing by having the SRCU grace period processing and callback invocation functionality 40 (FIG. 6) check whether this counter has advanced beyond the sdp→srcu_gp_seq needed counter by a specified number of grace periods (such as 100), and if so, advancing the latter counter so that the values of the two counters are equal.

Accordingly, a funnel locking technique for improving scalability of callback handling while mediating grace-period-start requests in a sleepable read-copy update (SRCU) has been disclosed. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 5-9B.

With respect to a computer program product, digitally encoded program instructions may be stored on one or more non-transitory computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer readable data storage media for storing such program instructions are shown by reference numerals 8 (memory) and 10 (cache) of the computer system 2 of FIG. 5. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawing figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A funnel locking method for improving scalability of callback handling while mediating grace-period-start requests in a sleepable read-copy update (SRCU) environment, said method comprising:
   providing an SRCU environment to, in part, update shared data, said SRCU environment being characterized by an ability of SRCU readers that access said shared data to sleep within respective SRCU read-side critical sections while SRCU updaters post SRCU callbacks representing requests for deferred destruction, for respective grace periods, of shared data elements of said shared data, and further characterized by isolation of SRCU grace-period detection within a subsystem of a computer software system so that memory reclamation by said SRCU updaters in said subsystem is not blocked by said SRCU readers in other subsystems;
   said SRCU environment bifurcating tracking said respective grace periods that are recorded in SRCU grace period records from tracking of said SRCU callbacks, the bifurcating including:
      storing in a memory one or more sets of per-CPU data structures, each set of per-CPU data structures of the one or more sets of per-CPU data structures maintaining a list of SRCU callbacks enqueued by said SRCU updaters and maintaining grace-period-needed records; and
      storing in said memory an SRCU management data structure separate from the one or more sets of per-CPU data structures, the SRCU management data structure maintaining a current-grace-period record that tracks a current SRCU grace period, and a future-grace-period record that tracks a farthest-in-the-future SRCU grace period needed by said SRCU callbacks enqueued by said SRCU updaters;
   comparing said grace-period-needed records of said one or more sets of per-CPU data structures to said future-grace-period record of said SRCU management data structure to identify grace-period-start requests to be issued;
   issuing a plurality of grace-period-start requests identified by said comparing, said grace-period-start requests being issued on behalf of said SRCU callbacks to a leaf level of a combining tree comprising plural leaf level nodes;
   mediating said plurality of issued grace-period-start requests concurrently vying for an opportunity to update said future-grace-period record of said SRCU maintenance data structure, said mediating comprising:
      propagating said issued grace-period-start requests toward a single root node of said combining tree;
      based on said propagating, updating said SRCU grace period records of said SRCU management data structure, said SRCU grace period records that are updated including said future-grace-period record and a current-grace-period record that is used to start a new SRCU grace period requested by said grace-period-start requests;
      based on said propagating, determining that said grace-period-needed records stored by a set of per-CPU data structures of said one or more sets of per-CPU data structures lag behind current-grace-period records of said SRCU maintenance data structure by a predetermined amount, said predetermined amount comprising a predetermined number of grace periods; and
      based on said determining, updating said grace-period-needed records to prevent corruption of said grace-period-needed records during wrapping of one or more fields that are used by said SRCU callbacks.

2. The method of claim 1, wherein said propagating of said grace-period-start requests toward said root node of said combining tree includes checking at one or more levels of said combining tree to determine whether future SRCU grace periods represented by any of said grace-period-start requests have already completed and, based on said checking, determining that at least one grace-period-start request of said grace-period-start requests has already completed, and based thereon, discontinuing said propagating for said at least one grace-period-start request.

3. The method of claim 2, wherein based on said discontinuing of said propagating for said at least one grace-period-start request, scheduling SRCU callback invocation for destruction of said data elements for CPUs associated with said at least one grace-period-start request whose propagation is discontinued, said scheduling being performed in response to said checking being performed at a leaf-level node of said plural leaf level nodes of said combining tree.

4. The method of claim 1, wherein said grace-period-needed records comprise an array of different SRCU grace period numbers that are used to perform said mediating of said grace-period-start requests concurrently requesting different SRCU grace periods while bounding contention.

5. The method of claim 1, wherein said issuing of said plurality of grace-period-start requests is conditioned on per-CPU grace-period-needed records recording SRCU grace periods that are earlier than said SRCU grace periods for which said grace-period-start requests are issued.

6. The method of claim 1, wherein said propagating includes recording, in said grace-period-needed records, SRCU grace periods associated with said grace-period-start requests, said recording using a state indicator of state indicators that indicate whether an SRCU grace period recorded therein has completed, said state indicator facilitating determining whether to continue propagating a future grace-period-start request corresponding to said SRCU grace period.

7. A system, comprising:
a plurality of CPUs;
a memory coupled to said CPUs, said memory including a computer readable storage medium tangibly embodying at least one program of instructions executable by said CPUs to perform operations for improving scalability of callback handling while mediating grace-period-start requests in a sleepable read-copy update (SRCU) environment, said method comprising:
providing an SRCU environment to, in part, update shared data, said SRCU environment being characterized by an ability of SRCU readers that access said shared data to sleep within respective SRCU read-side critical sections while SRCU updaters post SRCU callbacks representing requests for deferred destruction, for respective grace periods, of shared data elements of said shared data, and further characterized by isolation of SRCU grace-period detection within a subsystem of a computer software system so that memory reclamation by said SRCU updaters in said subsystem is not blocked by said SRCU readers in other subsystems;
said SRCU environment bifurcating tracking said respective grace periods that are recorded in SRCU grace period records from tracking of said SRCU callbacks, the bifurcating including:
storing in a memory one or more sets of per-CPU data structures, each set of per-CPU data structures of the one or more sets of per-CPU data structures maintaining a list of SRCU callbacks enqueued by said SRCU updaters and maintaining grace-period-needed records; and
storing in said memory an SRCU management data structure separate from the one or more sets of per-CPU data structures, the SRCU management data structure maintaining a current-grace-period record that tracks a current SRCU grace period, and a future-grace-period record that tracks a farthest-in-the-future SRCU grace period needed by said SRCU callbacks enqueued by said SRCU updaters;
comparing said grace-period-needed records of said one or more sets of per-CPU data structures to said future-grace-period record of said SRCU management data structure to identify grace-period-start requests to be issued;
issuing a plurality of grace-period-start requests identified by said comparing, said grace-period-start requests being issued on behalf of said SRCU callbacks to a leaf level of a combining tree comprising plural leaf level nodes;
mediating said plurality of issued grace-period-start requests concurrently vying for an opportunity to update said future-grace-period record of said SRCU maintenance data structure, said mediating comprising:
propagating said issued grace-period-start requests toward a single root node of said combining tree;
based on said propagating, updating said SRCU grace period records of said SRCU management data structure, said SRCU grace period records that are updated including said future-grace-period record and a current-grace-period record that is used to start a new SRCU grace period requested by said grace-period-start requests;
based on said propagating, determining that said grace-period-needed records stored by a set of per-CPU data structures of said one or more sets of per-CPU data structures lag behind current-grace-period records of said SRCU maintenance data structure by a predetermined amount, said predetermined amount comprising a predetermined number of grace periods; and
based on said determining, updating said grace-period-needed records to prevent corruption of said grace-period-needed records during wrapping of one or more fields that are used by said SRCU callbacks.

8. The system of claim 7, wherein said propagating of said grace-period-start requests toward said root node of said combining tree includes checking at one or more levels of said combining tree to determine whether future SRCU grace periods represented by any of said grace-period-start requests have already completed and, based on said checking, determining that at least one grace-period-start request of said grace-period-start requests has already completed, and based thereon, discontinuing said propagating for said at least one grace-period-start request.

9. The system of claim 8, wherein based on said discontinuing of said propagating for said at least one grace-period-start request, scheduling SRCU callback invocation for destruction of said data elements for CPUs associated with said at least one grace-period-start request whose propagation is discontinued, said scheduling being performed in response to said checking being performed at a leaf-level node of said plural leaf level nodes of said combining tree.

10. The system of claim 7, wherein said grace-period-needed records comprise an array of different SRCU grace period numbers that are used to perform said mediating of said grace-period-start requests concurrently requesting different SRCU grace periods while bounding contention.

11. The system of claim 7, wherein said issuing of said plurality of grace-period-start requests is conditioned on said per-CPU grace-period-needed records recording SRCU grace periods that are earlier than said SRCU grace periods for which said grace-period-start requests are issued.

12. The system of claim 7, wherein said propagating includes recording, in said grace-period-needed records, SRCU grace periods associated with said grace-period-start requests, said recording using a state indicator of state indicators that indicate whether an SRCU grace period recorded therein has completed, said state indicator facilitating determining whether to continue propagating a future grace-period-start request corresponding to said SRCU grace period.

13. A computer program product, comprising:
one or more non-transitory computer readable data storage media;
program instructions stored on said one or more computer readable data storage media for programming a data processing platform having a plurality of CPUs to perform operations for improving scalability of callback handling while mediating grace-period-start requests in a sleepable read-copy update (SRCU) environment, said method comprising:

providing an SRCU environment to, in part, update shared data, said SRCU environment being characterized by an ability of SRCU readers that access said shared data to sleep within respective SRCU read-side critical sections while SRCU updaters post SRCU callbacks representing requests for deferred destruction, for respective grace periods, of shared data elements of said shared data, and further characterized by isolation of SRCU grace-period detection within a subsystem of a computer software system so that memory reclamation by said SRCU updaters in said subsystem is not blocked by said SRCU readers in other subsystems;

said SRCU environment bifurcating tracking said respective grace periods that are recorded in SRCU grace period records from tracking of said SRCU callbacks, the bifurcating including:

storing in a memory one or more sets of per-CPU data structures, each set of per-CPU data structures of the one or more sets of per-CPU data structures maintaining a list of SRCU callbacks enqueued by said SRCU updaters and maintaining grace-period-needed records; and storing in said memory an SRCU management data structure separate from the one or more sets of per-CPU data structures, the SRCU management data structure maintaining a current-grace-period record that tracks a current SRCU grace period, and a future-grace-period record that tracks a farthest-in-the-future SRCU grace period needed by said SRCU callbacks enqueued by said SRCU updaters;

comparing said grace-period-needed records of said one or more sets of per-CPU data structures to said future-grace-period record of said SRCU management data structure to identify grace-period-start requests to be issued;

issuing a plurality of grace-period-start requests identified by said comparing, said grace-period-start requests being issued on behalf of said SRCU callbacks to a leaf level of a combining tree comprising plural leaf level nodes;

mediating said plurality of issued grace-period-start requests concurrently vying for an opportunity to update said future-grace-period record of said SRCU maintenance data structure, said mediating comprising:

propagating said issued grace-period-start requests toward a single root node of said combining tree;

based on said propagating, updating said SRCU grace period records of said SRCU management data structure, said SRCU grace period records that are updated including said future-grace-period record and a current-grace-period record that is used to start a new SRCU grace period requested by said grace-period-start requests;

based on said propagating, determining that said grace-period-needed records stored by a set of per-CPU data structures of said one or more sets of per-CPU data structures lag behind current-grace-period records of said SRCU maintenance data structure by a predetermined amount, said predetermined amount comprising a predetermined number of grace periods; and based on said determining, updating said grace-period-needed records to prevent corruption of said grace-period-needed records during wrapping of one or more fields that are used by said SRCU callbacks.

14. The computer program product of claim 13, wherein said propagating of said grace-period-start requests toward said root node of said combining tree includes checking at one or more levels of said combining tree to determine whether future SRCU grace periods represented by any of said grace-period-start requests have already completed and, based on said checking, determining that at least one grace-period-start request of said grace-period-start requests has already completed, and based thereon, discontinuing said propagating for said at least one grace-period-start request.

15. The computer program product of claim 14, wherein based on said discontinuing of said propagating for said at least one grace-period-start request, scheduling SRCU callback invocation for destruction of said data elements for CPUs associated with said at least one grace-period-start request whose propagation is discontinued, said scheduling being performed in response to said checking being performed at a leaf-level node of said plural leaf level nodes of said combining tree.

16. The computer program product of claim 13, wherein said grace-period-needed records comprise an array of different SRCU grace period numbers that are used to perform said mediating of said grace-period-start requests concurrently requesting different SRCU grace periods while bounding contention.

17. The computer program product of claim 13, wherein said issuing of said plurality of grace-period-start requests is conditioned on said per-CPU grace-period-needed records recording SRCU grace periods that are earlier than said SRCU grace periods for which said grace-period-start requests are issued.

18. The computer program product of claim 13, wherein said propagating includes recording, in said grace-period-needed records, SRCU grace periods associated with said grace-period-start requests, said recording using a state indicator of state indicators that indicate whether an SRCU grace period recorded therein has completed, said state indicator facilitating determining whether to continue propagating a future grace-period-start request corresponding to said SRCU grace period.

* * * * *